US009575828B2

(12) United States Patent
Agarwal et al.

(10) Patent No.: US 9,575,828 B2
(45) Date of Patent: Feb. 21, 2017

(54) CORRECTLY IDENTIFYING POTENTIAL ANOMALIES IN A DISTRIBUTED STORAGE SYSTEM

(71) Applicant: CISCO TECHNOLOGY, INC., San Jose, CA (US)

(72) Inventors: Amit Agarwal, San Jose, CA (US); Debojyoti Dutta, Santa Clara, CA (US); Johnu George, San Jose, CA (US); Manoj Sharma, Sunnyvale, CA (US); Kai Zhang, San Jose, CA (US); Marc Solanas Tarre, San Jose, CA (US); Aparupa Das Gupta, San Jose, CA (US); Yathiraj B. Udupi, San Jose, CA (US); Seth Mason, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 57 days.

(21) Appl. No.: 14/794,676

(22) Filed: Jul. 8, 2015

(65) Prior Publication Data

US 2017/0010931 A1    Jan. 12, 2017

(51) Int. Cl.
*G06F 11/00* (2006.01)
*G06F 11/07* (2006.01)
*H04L 29/08* (2006.01)

(52) U.S. Cl.
CPC ......... *G06F 11/079* (2013.01); *G06F 11/0727* (2013.01); *G06F 11/0751* (2013.01);
(Continued)

(58) Field of Classification Search
CPC ... G06F 11/0793; G06F 11/1092; G06F 11/07; G06F 11/1448; G06F 11/0766; G06F 11/079; G06F 11/008; G06F 11/0709; G06F 3/067; G06F 3/0614; G06F 3/0683
See application file for complete search history.

(56) References Cited

U.S. PATENT DOCUMENTS 6,408,406 B1    6/2002 Parris
7,346,751 B2    3/2008 Prahlad et al.
(Continued)

OTHER PUBLICATIONS

Chakrabarti, Kaushik, et al., "Locally Adaptive Dimensionality Reduction for Indexing Large Time Series Databases," ACM Transactions on Database Systems, vol. 27, No. 2, Jun. 2009, pp. 188-228.
(Continued)

*Primary Examiner* — Nadeem Iqbal
(74) *Attorney, Agent, or Firm* — Patent Capital Group

(57) ABSTRACT

A method for assisting evaluation of anomalies in a distributed storage system is disclosed. The method includes a step of monitoring at least one system metric of the distributed storage system. The method further includes steps of maintaining a listing of patterns of the monitored system metric comprising patterns which previously did not result in a failure within one or more nodes of the distributed storage system, and, based on the monitoring, identifying a pattern (i.e., a time series motif) of the monitored system metric as a potential anomaly in the distributed storage system. The method also includes steps of automatically (i.e. without user input) performing a similarity search to determine whether the identified pattern satisfies one or more predefined similarity criteria with at least one pattern of the listing, and, upon positive determination, excepting the identified pattern from being identified as the potential anomaly.

20 Claims, 4 Drawing Sheets

(52) U.S. Cl.
CPC ...... *G06F 11/0787* (2013.01); *G06F 11/0793* (2013.01); *H04L 67/1097* (2013.01)

(56) References Cited

U.S. PATENT DOCUMENTS

| | | | |
|---|---|---|---|
| 7,774,839 B2 | 8/2010 | Nazzal | |
| 7,975,175 B2 * | 7/2011 | Votta | G06F 11/004 714/13 |
| 8,392,760 B2 | 3/2013 | Kandula et al. | |
| 8,677,485 B2 | 3/2014 | Sharma et al. | |
| 8,868,474 B2 | 10/2014 | Leung et al. | |
| 8,887,286 B2 | 11/2014 | Dupont et al. | |
| 8,949,677 B1 * | 2/2015 | Brundage | G06F 11/0745 714/48 |
| 2014/0172371 A1 * | 6/2014 | Zhu | G06F 11/0709 702/185 |
| 2015/0046123 A1 * | 2/2015 | Kato | G06F 11/079 702/183 |
| 2015/0082432 A1 | 3/2015 | Eaton et al. | |

OTHER PUBLICATIONS

Chandola, Varun, "A Gaussian Process Based Online Change Detection Algorithm for Monitoring Periodic Time Series," Proceedings of the Eleventh SIAM International Conference on Data Mining, SDM 2011, Apr. 28-30, 2011, Mesa, Arizona; 12 pages.

Horn, C., et al., "Online anomaly detection with expert system feedback in social networks," 2011 IEEE International Conference on Acoustics, Speech and Signal Processing (ICASSP), May 22-27, 2011, Prague; [Abstract only].

Keogh, Eamonn, et al., "Dimensionality Reduction for Fast Similarity Search in Large Time Series Databases," KAIS Long Paper submitted May 16, 2000; 19 pages.

Lin, Jessica, "Finding Motifs in Time Series," SIGKDD'02 Jul. 23,-26, 2002, Edmonton, Alberta, Canada.

Ma, Ao, et al., "RAIDShield: Characterizing, Monitoring, and Proactively Protecting Against Disk Failures," FAST '15, 13th USENIX Conference on File and Storage Technologes, Feb. 16-19, 2015, Santa Clara, CA; 17 pages.

Mueen, Abdullah, et al., "Online Discovery and Maintenance of Time Series Motifs," KDD'10 The 16th ACM SIGKDD International Conference on Knowledge Discovery and Data Mining, Jul. 25-28, 2010, Washington, DC; 10 pages.

Murray, Joseph F., et al., "Machine Learning Methods for Predicting Failures in Hard Drives: A Multiple-Instance Application," Journal of Machine Learning Research 6 (2005), pp. 783-816; May 2005, 34 pages.

Pace, Alberto, "Technologies for Large Data Management in Scientific Computing," International Journal of Modern Physics C., vol. 25, No. 2 (Feb. 2014) 143001; 72 pages.

Pinheiro, Eduardo, et al., "Failure Trends in a Large Disk Drive Population," FAST '07, 5th USENIX Conference on File and Storage Technologies, Feb. 13-16, 2007, San Jose, CA; 13 pages.

Raginsky, Maxim, et al., "Sequential Anomaly Detection in the Presence of Noise and Limited Feedback," arXiv:0911.2904v4 [cs.LG] Mar. 13, 2012; 19 pages.

Schroeder, Bianca, et al., "Disk failures in the real world: What does an MTTF of 1,000,000 hours mean to you?" FAST '07: 5th USENIX Conference on File and Storage Technologies, Feb. 13-16, 2007, San Jose, CA; 16 pages.

Zhou, Zihan, et al., "Stable Principal Component Pursuit," arXiv:1001.2363[cs.IT], Jan. 14, 2010; 5 pages.

U.S. Appl. No. 14/794,650, filed Jul. 8, 2015, entitled "Interactive Mechanism to View Logs and Metrics Upon an Anomaly in a Distributed Storage System," Inventor(s): Debojyoti Dutta et al.

* cited by examiner

CORRECTLY IDENTIFYING POTENTIAL ANOMALIES IN A DISTRIBUTED STORAGE SYSTEM

TECHNICAL FIELD

This disclosure relates in general to the field of data storage and, in particular, to evaluating anomalies in a distributed storage system in a network environment. More specifically, this disclosure relates to correctly identifying potential anomalies in a distributed storage system.

BACKGROUND

In recent years, cloud-based storage has emerged to offer a solution for storing, accessing, and managing electronic data owned or controlled by various types of private and public entities. Distributed storage systems may offer a storage platform designed to provide object based, block based, and file based storage from a single distributed storage cluster in a cloud. A distributed storage cluster may contain numerous nodes for storing objects and other data. Generally, a distributed storage system is designed to evenly distribute data across the cluster. Multiple replicas of data can be maintained according to a replication factor in order to provide fault tolerance and high availability to users, applications, and other systems. When node failure occurs in a cluster, replicas may be copied to new nodes to maintain the replication factor in the cluster.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Figure 1:
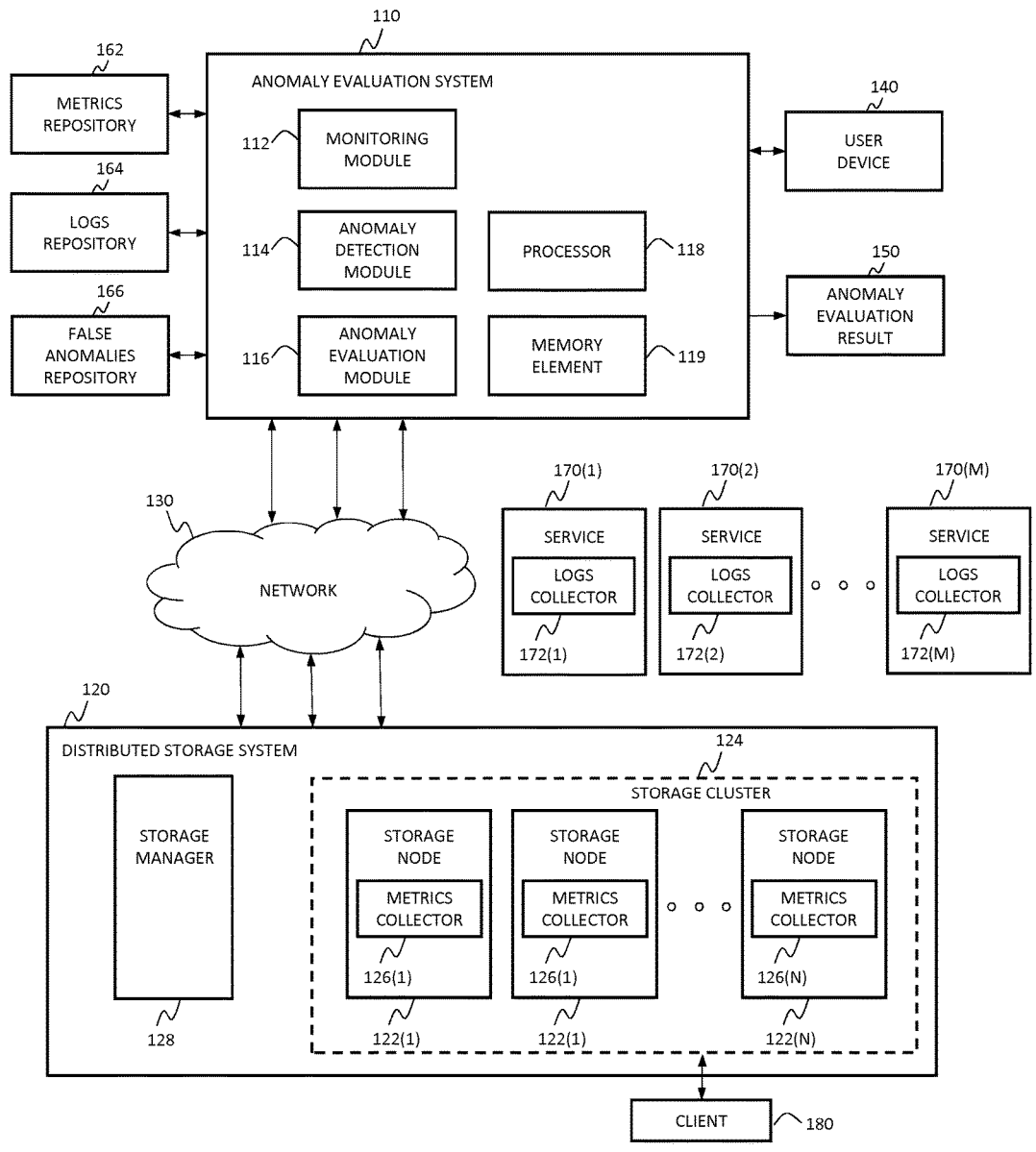
FIG. 1 is a simplified block diagram of a network environment including an anomaly evaluation system for a distributed data storage system, according to some embodiments of the present disclosure.

Embodiments of the present disclosure provide various methods and systems for assisting evaluation of anomalies in a distributed storage system.

One aspect of the present disclosure relates to an interactive mechanism to view logs and metrics upon an anomaly. In this aspect, a first computer-implemented method for assisting evaluation of anomalies in a distributed storage system includes steps of monitoring at least one system metric of the distributed storage system and creating a mapping between values and/or patterns of the monitored system metric and one or more services configured to generate logs for the distributed storage system. The first method further includes steps of using the monitoring to detect a potential anomaly in the distributed storage system, where the potential anomaly is associated with a value and/or a pattern (i.e., a time series motif) of the monitored system metric, and of using the created mapping to identify one or more logs generated by the one or more services and associated with the potential anomaly. The first method also includes steps of displaying a graphical representation of at least a portion of the monitoring of the system metric, the graphical representation indicating the detected potential anomaly, and providing an overlay over the graphical representation, where the overlay includes an indicator of a number of logs identified as being associated with the potential anomaly. In an embodiment, the indicator of the number of logs could be provided e.g. by varying the size of the overlaid indicator (e.g. the larger the indicator symbol, the more logs are associated with the potential anomaly).

Another aspect of the present disclosure relates to correctly identifying potential anomalies. In this aspect, a second computer-implemented method for assisting evaluation of anomalies in a distributed storage system includes, again, a step of monitoring at least one system metric of the distributed storage system. The second method further includes steps of maintaining a listing of patterns of the monitored system metric comprising patterns which previously did not result in a failure within one or more nodes of the distributed storage system, and, based on the monitoring, identifying a pattern (i.e., a time series motif) of the monitored system metric as a potential anomaly in the distributed storage system. The second method also includes steps of automatically (i.e. without user input) performing a similarity search to determine whether the identified pattern satisfies one or more predefined similarity criteria with at least one pattern of the listing, and, upon positive determination, excepting the identified pattern from being identified as a potential anomaly (i.e., excluding the identified pattern from being identified as potential anomaly).

Since embodiments of the methods described herein involve evaluation of anomalies in a distributed storage system, a functional entity performing embodiments of these methods will be referred to in the following as an "anomaly evaluation system." Such a functional entity could be implemented within any network element or distributed among a plurality of network elements associated with a distributed storage system. For example, one or more of compute servers that may form a networked cluster in the distributed storage system to which the storage disks are connected to may be configured to implement the anomaly evaluation features to observe and process the anomalies such as those seen in terms of the storage disk read/write access speeds, which can potentially indicate a forthcoming disk failure.

As will be appreciated by one skilled in the art, aspects of the present disclosure, in particular the functionality of the anomaly evaluation system described herein, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded to the existing devices and systems (e.g. to the existing network elements such as the existing servers, routers, switches, various control nodes, etc.) or be stored upon manufacturing of these devices and systems.

Example Embodiments

FIG. 1 is a simplified block diagram of an example network environment 100 comprising an anomaly evaluation system 110 for evaluating anomalies in a distributed storage system 120. The anomaly evaluation system 110 can communicate with a plurality of storage nodes 122(1) through 122(N) in a storage cluster 124, via a network 130. Each storage node can include a metrics collector 126(1) through 126(N), respectively, for providing real-time metrics associated with the storage nodes to the anomaly evaluation system 110. The distributed storage system 120 may further include a storage manager 128 configured to manage the storage cluster 124.

In at least one embodiment, the anomaly evaluation system 110 can include a monitoring module 112, an anomaly detection module 114, and an anomaly evaluation module 116. The anomaly evaluation system 110 can also include at least one processor 118 and at least one memory element 119, along with any other suitable hardware to enable its intended functionality. The anomaly evaluation system 110 may also include a user interface (not shown in FIG. 1) to enable communication with a user device 140, which may be operated by a user. As a result of performing functionality described herein, the anomaly evaluation system 110 can produce an anomaly evaluation result 150.

Optionally, in different embodiments, various repositories may be associated with the anomaly evaluation system 110, including, but not limited to, a metrics repository 162, a logs repository 164, a false anomalies repository 166.

At least for the aspects of the present disclosure related to the interactive mechanism to view logs and metrics upon an anomaly, the anomaly evaluation system 110 can also communicate with one or more service providers (referred to herein simply as "services") 170(1) through 170(M), either directly, via the network 130, or via another network not shown in FIG. 1. Each service provider can include a logs collector 172(1) through 172(M), respectively, for providing real-time logs associated with the individual storage nodes, the distributed storage system as a whole, and/or parts of the distributed storage system, to the anomaly evaluation system 110. In order to generate logs related to the distributed storage system 120, the services 170(1) through 170(M) could be communicatively connected to the distributed storage system 120 directly, via the network 130, or via another network not shown in FIG. 1.

Elements of FIG. 1 may be coupled to one another through one or more interfaces employing any suitable connections (wired or wireless), which provide viable pathways for network communications. Additionally, one or more of these elements of FIG. 1 may be combined, divided, or removed from the architecture based on particular configuration needs. Network environment 100 may include a configuration capable of transmission control protocol/internet protocol (TCP/IP) communications for the transmission and/or reception of packets in the network. Network environment 100 may also operate in conjunction with a user datagram protocol/IP (UDP/IP), any other suitable protocol, or any suitable combination thereof where appropriate and based on particular needs.

For purposes of illustrating the techniques of the anomaly evaluation system 110, it is important to understand the activities that may be present in network environment 100. The following foundational information may be viewed as a basis from which the present disclosure may be properly explained. Such information is offered for purposes of explanation only and, accordingly, should not be construed in any way to limit the broad scope of the present disclosure and its potential applications.

In recent years, distributed storage systems for objects have emerged to provide a scalable option for cloud storage with greater accessibility and protection of stored data. Object storage involves storing one or more chunks of data in an object. Each object can include metadata and a unique identifier. Distributed storage systems can also be applied to other types of data storage such as block storage and file storage, for example. In block storage data can be stored in blocks (or volumes), where each block acts as an individual hard drive. File storage is generally a hierarchical way of organizing files containing data such that an individual file can be located by a path to that file. Certain metadata describing a file and its contents is also typically stored in a file system. In distributed storage systems, multiple replicas of data in any suitable type of structure (e.g., objects, files, blocks) can be maintained in order to provide fault tolerance and high availability. Although embodiments herein may be described with reference to objects and distributed object storage, this is done for ease of illustration and it should be understood that these embodiments may also be applicable to other types of data storage structures (e.g., block, file) and distributed storage including, but not limited to file and block storage systems.

An example distributed storage system that provides high fault tolerance and availability includes Ceph, which is described by Sage A. Weil in the dissertation, "Ceph: Reliable, Scalable, and High-Performance Distributed Storage," University of California, Santa Cruz, December 2007. Ceph is open source software designed to provide object, block and file storage from a distributed storage cluster. The storage cluster can be comprised of storage nodes with one or more memory elements (e.g., disks) for storing data. Storage nodes are also referred to as object storage devices (OSDs), which can be physical or logical storage elements. Storage nodes generally include an object storage device (OSD) software or daemon, which actually stores data as objects on the storage nodes. Ceph OSD software typically stores data on a local filesystem including, but not limited to, a B-tree file system (Btrfs). At least one Ceph metadata server can be provided for a storage cluster to store metadata associated with the objects (e.g., inodes, directories, etc.). Ceph monitors are provided for monitoring active and failed storage nodes in the cluster. It should be understood that references herein to a 'distributed object storage system' and 'distributed storage system' are intended to include, but are not necessarily limited to Ceph.

Typically, storage node failure in one or more storage nodes of a distributed storage system, or a network partition failure, creates a significant risk of cascading failures in the storage system. Therefore, monitoring of the distributed storage system resources in terms of metrics of various measurable attributes as well as analyzing log messages emitted by the various software services running is essential to ensure smooth operation. Often, there are situations when certain anomalies are seen in the underlying systems, and these may need to be watched for to take certain remedial actions. However most systems monitor the metrics separately from the log messages in the system, which complicates the process of timely evaluating anomalies. Furthermore, correctly identifying anomalies remains challenging. Therefore, in distributed storage systems such as Ceph, optimizations of anomaly evaluation processes are needed that could improve on at least some of these drawbacks.

In accordance with at least one embodiment of the present disclosure, the network environment 100 can provide improvements to the aforementioned issues associated with anomaly evaluation processes of distributed storage systems.

Turning, again, to the infrastructure of FIG. 1, FIG. 1 is a simplified block diagram including the distributed storage system 110 connected via the network 130 to the anomaly evaluation system 110 in the network environment 100. The network 130 represents a series of points or nodes of interconnected communication paths for receiving and transmitting packets of information that propagate through the network environment 100. The network 130 offers a communicative interface between nodes (e.g., storage nodes 122(1)-122(N)) and the anomaly evaluation system 110, and may include any type or topology of one or more networks such as a local area network (LAN), wireless local area network (WLAN), metropolitan area network (MAN), virtual local area network (VLAN), Intranet, Extranet, wide area network (WAN) such as the Internet, virtual private network (VPN), any other appropriate network configuration, or any suitable combination thereof that facilitates communications in the network environment 100. The network 130 can comprise any number of hardware or software elements coupled to (and in communication with) each other through a communications medium. In at least some embodiments, other elements in the network environment 100 may also communicate via one or more networks such as those described with reference to the network 130. For ease of illustration, however, not all elements of FIG. 1 are depicted with communication lines traversing the network 130 (e.g., storage manager 128, metrics repository 162, user device 140, etc.).

In the network 130, network traffic, which could include packets, frames, signals, cells, datagrams, protocol data units (PDUs), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). A packet is a unit of data for communicating information in a network, and can be routed between a source node (e.g., the anomaly evaluation system 110) and a destination node (e.g., storage nodes 122(1)-122(N)) via the network 130. A packet includes, but is not limited to, a source network address, a destination network address, and a payload containing the information to be communicated. By way of example, these network addresses can be Internet Protocol (IP) addresses in a TCP/IP messaging protocol. Information is generally represented by data and, as used herein, 'data' refers to any type of binary, numeric, voice, video, media, textual, or script data, or any type of source or object code, or any other suitable information in any appropriate format that may be communicated from one point to another in electronic devices and/or networks.

The storage nodes 122(1)-122(N) include physical or logical storage elements with one or more disks for storing electronic data. In embodiments disclosed herein, data is stored in storage nodes 122(1)-122(N). For object storage, each object may have a unique identifier and associated metadata. Storage device software may be provided in each storage node to determine storage locations for data, to store the data, and to provide access to the data over the network. Data in storage nodes 122(1)-122(N) can be accessed by clients, such as e.g. a client 180, by an application programming interface (API) or hypertext transfer protocol (HTTP), for example. The client 180 can enable users and/or applications to access the data.

As shown in FIG. 1, a storage manager 128 may be provided in the distributed storage system 120 to manage the storage cluster 124. In Ceph, for example, storage manager 128 may include a metadata server to store metadata associated with objects in the storage nodes, and a Ceph monitor to store cluster membership, configuration and state.

In at least one embodiment, each storage node 122(1)-122(N) can include a corresponding metrics collector 126(1)-126(N), respectively. Metrics collectors 126(1)-126(N) can be configured to push system metrics of the storage nodes 122(1)-122(N) to the anomaly evaluation system 110. System metrics can include information related to current system activity including, but not limited to, on-going client operations, current central processing unit (CPU) utilization, disk usage or load on the storage nodes, available network bandwidth, remaining disk input/output operations per second (IOPS), remaining disk bandwidth, etc. In at least one embodiment, these system metrics can be pushed to the anomaly evaluation system by the metrics collectors in real-time. The anomaly evaluation system 110 may store the system metrics in metrics repository 162, which may be internal to the anomaly evaluation system 110 or external (entirely or in part). In other embodiments, metrics collectors 126(1)-126(N) may store real-time system metrics in the metrics repository 162 without accessing the anomaly evaluation system 110.

Similarly, for the embodiments that involve the use of logs, each service element 170(1)-170(M) can include a corresponding logs collector 172(1)-172(M), respectively. Logs collectors 172(1)-172(M) can be configured to push system logs of the distributed storage system 120 to the anomaly evaluation system 110. System logs can include information related to events, errors, device drivers, system changes etc. In at least one embodiment, these system logs can be pushed to the anomaly evaluation system by the logs collectors in real-time. The anomaly evaluation system 110 may store the system logs in logs repository 164, which may be internal to the anomaly evaluation system 110 or external (entirely or in part). In other embodiments, logs collectors 172(1)-172(M) may store real-time system logs in the logs repository 164 without accessing the anomaly evaluation system 110.

The anomaly evaluation system 110 can be implemented as one or more network elements in network environment 100. As used herein, the term 'network element' is meant to encompass servers, processors, modules, routers, switches, cable boxes, gateways, bridges, load balancers, firewalls, inline service nodes, proxies, or any other suitable device, component, element, or proprietary appliance operable to exchange information in a network environment. This network element may include any suitable hardware, software, components, modules, or interfaces that facilitate the operations thereof. This may be inclusive of appropriate algorithms and communication protocols that allow for the effective exchange of data or information.

In one implementation, the anomaly evaluation system 110 includes software to achieve (or to foster) optimizing anomaly evaluation processes for a distributed storage system, as outlined herein. Note that in one example, the anomaly evaluation system 110 can have an internal structure (e.g., processor 118, memory element 119, network interface card, etc.) to facilitate some of the operations described herein. In other embodiments, these optimization activities may be executed externally to the anomaly evaluation system 110, or included in some other network element to achieve this intended functionality. Alternatively, the anomaly evaluation system 110 may include this software (or reciprocating software) that can coordinate with other network elements in order to achieve the operations, as outlined herein. In still other embodiments, one or several devices may include any suitable algorithms, hardware, software, firmware, components, modules or interfaces that facilitate the operations thereof.

The anomaly evaluation system 110 can include several components, which may be combined or divided in any suitable way, to achieve the anomaly evaluation processes optimization activities disclosed herein. The monitoring module 112 can be configured to monitor storage nodes 122(1)-122(N) and system metrics. In at least one embodiment, monitoring can occur continuously, in real-time. The anomaly detection module 114 can be configured to detect potential anomalies based on the monitoring of system metrics by the monitoring module 112, as described in greater detail below. The anomaly evaluation module 116 can be configured to evaluate the detected anomalies as well as, in at least one embodiment, detect when one or more of the storage nodes fail. A storage node (or a partition thereof) may be determined to have failed when the storage node, a disk of the storage node, or a disk partition of the storage node crashes, loses data, stops communicating, or otherwise ceases to operate properly.

Also, in at least some embodiments, the anomaly detection module 114 and the anomaly evaluation module 116 analyzes monitored system metrics in order to detect an impending failure of one or more storage nodes (or partitions thereof). For example, certain system metrics may indicate that a particular storage node is likely to fail (e.g., excessive disk usage, minimal disk IOPS, low network bandwidth, high CPU utilization, etc.) or that performance is unacceptably low. One or more of the system metrics, or a particular combination of the system metrics, may indicate impending failure of a storage node based on thresholds, ranges, or any other suitable measure.

Monitoring module 112, anomaly detection module 114, and/or anomaly evaluation module 116 can provide or interact with a user interface to enable anomaly evaluation of the distributed storage system 120. In at least one embodiment, a user interface may be configured to enable a user (e.g., an IT administrator) to configure, delete, update/modify, and access policies related to anomaly detection and/or evaluation. Such policies may be stored in a policies repository (not shown in FIG. 1), which could be internal or external (at least in part) to the anomaly evaluation system 110.

Although embodiments herein are described with reference to distributed storage systems, these embodiments are equally applicable to distributed systems and cloud infrastructures other than storage systems (i.e. embodiments of the present disclosure are applicable for settings where nodes 122(1) through 122(N) are any network elements collectively providing computational, network, or resource functionality, and where manager 128 is any controller configured to manage the nodes 122(1) through 122(N).

Interactive Mechanism to View Logs and Metrics Upon an Anomaly

According to one aspect of the present disclosure, the anomaly evaluation system 110 of network environment 100 is configured to optimize the anomaly evaluation process in a distributed storage system, such as Ceph, by monitoring one or more system metrics measured in the system in context with (i.e. mapped to) logs generated by one or more services at the same time and providing an operator with an interactive, integrated view of the results of such monitoring, displaying both the system metrics and associated logs. Such combined monitoring and display of system metrics and logs may be particularly advantageous when a potential anomaly is detected, because enabling an operator to figure out all of the associated logs for related services when system metrics monitoring is exhibiting potentially anomalous behavior allows the operator to take actions to remedy the situation quicker, possibly avoiding a real or a major failure in the distributed storage system, or mitigating the consequences of an imminent failure or a failure that just occurred. For example, an operator may then promptly take actions ensuring that cascading failures are averted or/and that client-side operations (e.g. read/write operations) are not impacted (or at least minimally impacted).

Figure 2:
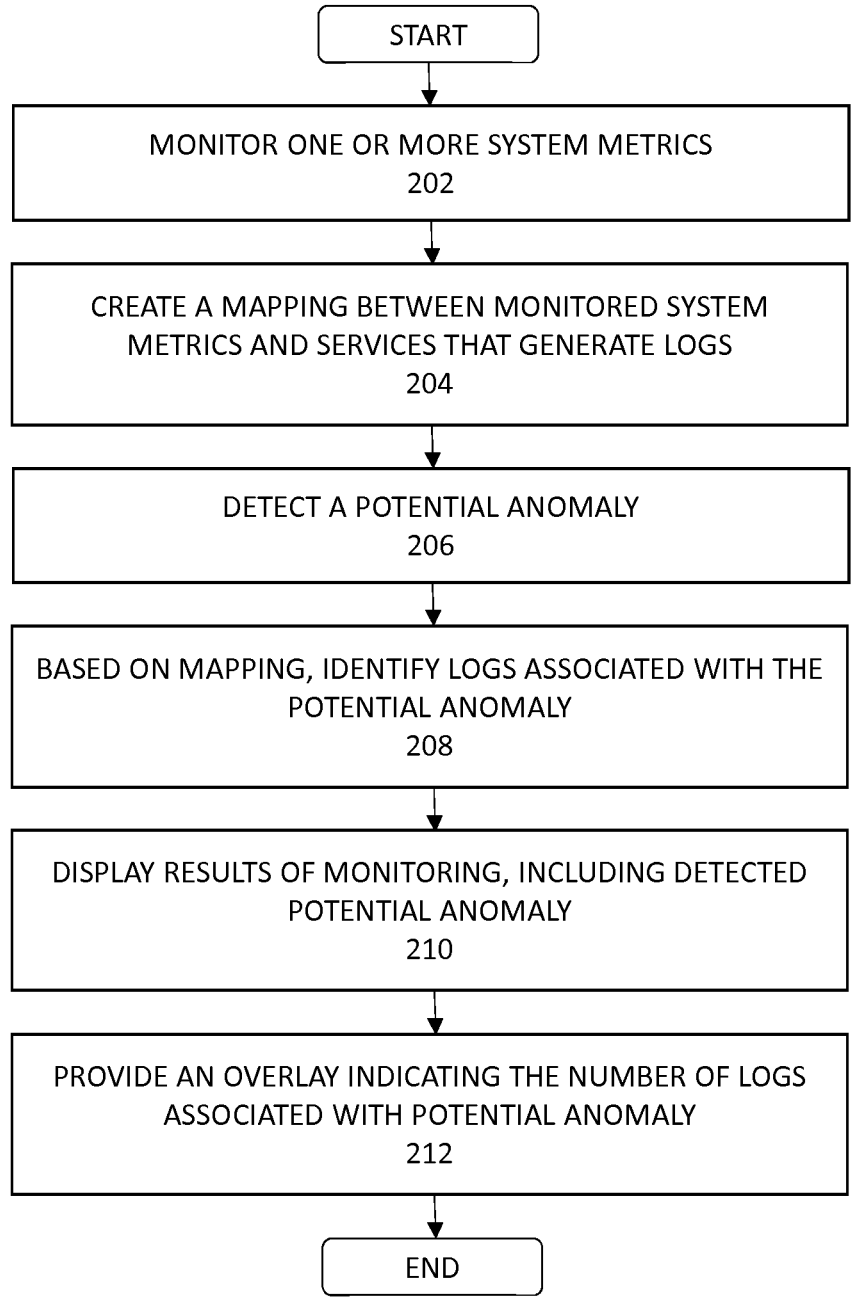
FIG. 2 shows a simplified flowchart of a first method for assisting evaluation of anomalies in a distributed storage system, according to some embodiments of the present disclosure.

FIG. 2 shows a simplified flowchart of a method 200 for assisting evaluation of anomalies in a distributed storage system, according to some embodiments of the present disclosure. The method 200 sets forth steps of the interactive mechanism to view logs and metrics upon an anomaly. While steps of the method 200 are described with reference to elements of the network environment 100 shown in FIG. 1, any network elements or systems, in any configuration, configured to perform steps of the method 200 are within the scope of the present disclosure.

At 202, the anomaly evaluation system 110 (e.g. the monitoring module 112) is monitoring one or more system metrics associated with one or more storage nodes in the cluster 124 of the distributed storage system 120. In various embodiments, the monitored system metrics may include information related to at least one of on-going client operations, current central processing unit (CPU) utilization, disk usage, available network bandwidth, remaining disk input/output operations per second (IOPS), remaining disk bandwidth, etc.

At the same time, the anomaly evaluation system 110 may have information regarding one or more services engaged to generate logs for the distributed storage system. In various embodiments, such services may correspond to individual storage nodes or their components included in the distributed storage system infrastructure, such as e.g. components corresponding to the services running the object storage daemons, monitoring daemons, and the compute and network components, that are essential in a distributed storage infrastructure.

At 204, the anomaly evaluation system 110 (e.g. the anomaly evaluation module 116) uses information about system metrics being monitored and associated services configured to generate logs for the distributed storage system to creating a mapping between values and/or patterns (i.e. a time series of values) of the monitored system metric(s) and the associated services. Such a mapping may, for example, associate metrics for disk read/write latency with some or all transactions logs.

At 206, the anomaly evaluation system 110 (e.g. the anomaly detection module 114) detects a potential anomaly in the distributed storage system indicating a failure of one or more storage nodes, or an impending failure of one or more storage nodes in the cluster, based on real-time system metrics being monitored.

It should be appreciated that, in the context of the present disclosure, detecting failure or impending failure of a storage node includes detecting failure or impending failure of the entire storage node, of one or more disks in the storage node, or of one or more disk partitions in the storage node. Real-time system metrics may be pushed to metrics repository 162 by the storage nodes 126(1)-126(N).

In various embodiments, the potential anomaly being identified in step 206 may be associated with either a single value, a plurality of values, and/or with a certain pattern (i.e., a time series motif) of the monitored system metric(s). In one non-limiting example, if disk read latency attains a very high value then it indicates a potential anomaly. In another non-limiting example, if both read and write latencies of a storage node are much higher than the read and write latencies of all other nodes in the system then it indicates a potential anomaly in the node with high latencies. In yet another non-limiting example, if a disk queue length attains a zero value for a certain number of units of time then the corresponding motif in time series can indicate a potential anomaly.

In some embodiments, a potential anomaly could be identified using Holt-Winters exponential smoothing or/and a Gaussian process based method. Some further means for detecting potential anomalies are described in greater detail in a dedicated section below.

At 208, the anomaly evaluation system 110 (e.g. the anomaly evaluation module 116) can use the mapping of 204 to identify logs that were generated by the services associated with the system metric for which the potential anomaly was detected in 206. For example, the anomaly evaluation system 110 could be configured to identify logs that were generated during the time period of the duration of the pattern in system metric(s) that was identified as a potential anomaly. In another example, the anomaly evaluation system 110 could be configured to identify logs that were generated a certain time before and/or a certain time after the occurrence of a value in system metric(s) that was identified as a potential anomaly. Such time periods could be predefined or dynamically computed by the anomaly evaluation system 110 based on e.g. current conditions in the distributed storage system, user input, etc.

Figure 3A:
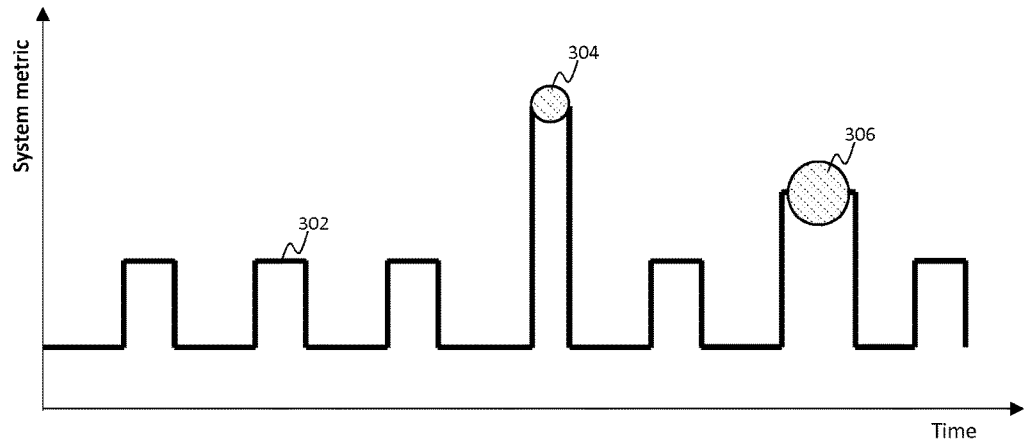
FIGS. 3A-3B provide simplified block diagrams illustrating use of an overlay over the graphical representation indicating one or more potential anomalies, according to some embodiments of the present disclosure.

At 210, the anomaly evaluation system 110 displays results of the monitoring, including the detected potential anomaly of 206. To that end, the anomaly evaluation system 110 may be configured to display, e.g. on the user device 140 or on a display associated with the anomaly evaluation system 110, a graphical representation of at least a part of monitoring of the system metric(s), the graphical representation indicating the detected potential anomaly. At 212, which could be performed substantially simultaneously with 210, the anomaly evaluation system 110 provides an overlay over the graphical representation, the overlay including an indicator of the number of logs identified to be associated with the potential anomaly at 208. In some embodiments, the indicator of the number of associated logs could be used to indicate the detected potential anomaly (i.e. a single indicator can indicate both the potential anomaly of 210 and the number of logs of 212). In some embodiments, an indication of the number of associated logs could be provided by varying the size of the overlaid indicator (e.g. the larger the indicator symbol, the more logs are associated with the potential anomaly). This is illustrated in FIG. 3A providing an example of the use of an overlay over the graphical representation indicating one or more potential anomalies, according to some embodiments of the present disclosure. FIG. 3A illustrates values of a system metric, e.g. disk read latency of a particular storage node or a number of storage nodes of the distributed storage system, as a function of time, with a graph 302. FIG. 3A illustrates two potential anomalies, shown with circles 304 and 306 overlaid over the graph 302, where the size of the circles 304 and 306 is indicative of the number of logs associated with each anomaly. Thus, the example of FIG. 3A illustrates that more logs were generated for the potential anomaly indicated with the circle 306 than for the potential anomaly indicated with the circle 304.

In an embodiment, the indicator of 212 could further indicate a likelihood of the detected potential anomaly being or leading to a failure within one or more nodes of the distributed storage system. For example, such an indication could be provided by color-coding the overlaid indicator (e.g. red color could indicate actual or imminent failure, while yellow color could indicate a lesser likelihood of failure).

Figure 3B:
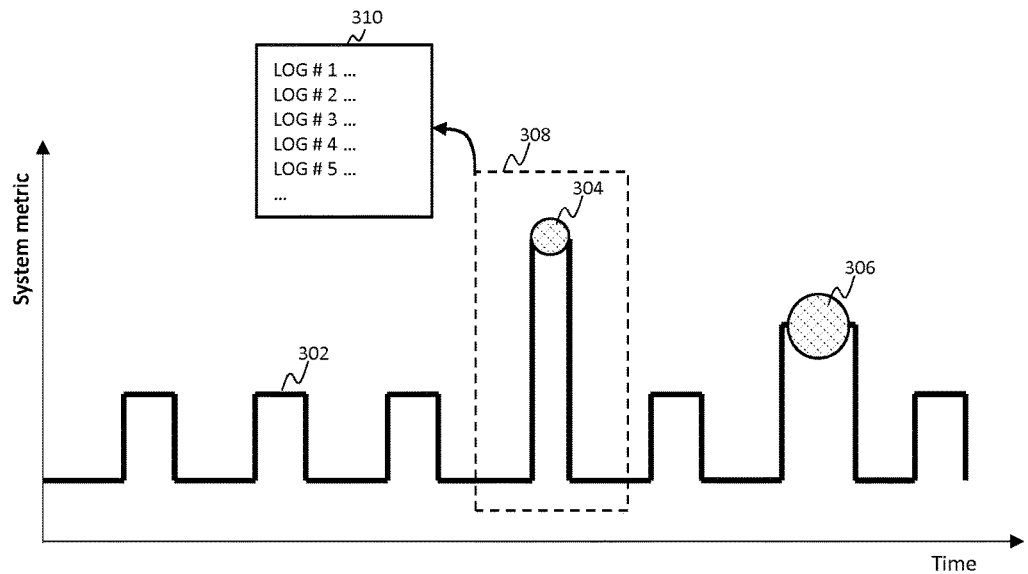

The interactive aspect of the anomaly evaluation system 110 may come into play by configuring the anomaly evaluation system 110 to e.g. display the identified logs associated with a particular detected potential anomaly. In an embodiment, such a display could be triggered by the anomaly evaluation system 110 receiving user input indicating operator's desire to view the logs (input provided e.g. via the user device 140). Such an embodiment advantageously allows an operator to select a particular potential anomaly detected in a metric and see all the logs for related services that were generated during the time period around which anomaly was detected. An example of this is shown in FIG. 3B which extends the illustration of FIG. 3A by also showing that the anomaly evaluation system 110 may provide a graphical user interface showing the graph 302 and the identified anomalies and enabling an operator to select one of the identified potential anomalies, e.g. anomaly 304 shown to be selected with a dashed box 308. As a result of the selection, the anomaly evaluation system 110 is configured to display logs associated with that anomaly, shown with a further overlap 310 displaying the logs. Of course, in other embodiments, other manners for presenting the indicators and the associated logs could be used, all of which are within the scope of the present disclosure.

In an embodiments, the method 200 may be extended with the anomaly evaluation system 110 being further be configured to perform a similarity search to identify whether one or more anomalies similar to the detected potential anomaly have occurred prior to occurrence of the potential anomaly (not shown in FIG. 2). One example of a similarity search is based on using Euclidean distance measure to determine if a given subsequence of values of the monitored system metric is similar to a certain other motif. Of course, other examples as known in the art are within the scope of the present disclosure as well.

In some embodiments, such a similarity search may be performed in response to receiving user input indicating that the search is to be performed (e.g. an operator may then define one or more of a number of parameters related to the search, such as e.g. one or more criteria of what is to be considered "similar", a time period to be searched, etc.). For example, an operator can select an anomaly as a time series motif (a subsequence with distinct pattern in the time series) and search for the time stamps at which similar anomaly was observed in the past few days (or any time interval, e.g. specified by the operator) for the same metric.

In other embodiments, such a similarity search may be performed automatically (i.e. without user input), e.g. triggered by the detection of a potential anomaly in 206.

In some embodiments, results of the similarity search may also be displayed on the graphical representation—i.e. a graphical representation could cover a larger time period and illustrate more than one anomalies similar to the detected potential anomaly, as well as their associated logs. Investigating logs and metrics of anomalies identified as similar in the past may advantageously enable an operator to make a determination of the likelihood that the more recent potential anomaly detected will lead to failure.

Correctly Identifying Potential Anomalies

According to another aspect of the present disclosure, the anomaly evaluation system 110 of network environment 100 is configured to optimize the anomaly evaluation process in a distributed storage system, such as Ceph, by automatically filtering the identified potential anomalies to exclude those that are not likely to lead to failure. To that end, once a potential anomaly is identified/detected, a similarity search is performed with a listing of other "anomalies" which were identified as "potential anomalies" in the past but did not lead to failure, and if match is found, then the newly identified potential anomaly is excepted from being identified as a potential anomaly. Such automatic filtering eliminates or reduces false positives and ensures that only the most relevant deviations from a "normal" behavior of system metrics are presented to an operator for analysis. The anomaly evaluation system 110 may be configured to provide an interactive feedback mechanism to identify, remember, and avoid such false positives in the future.

Providing an operator with a reduced subset of potential anomalies to review and evaluate allows the operator to take actions to remedy the situation quicker, possibly avoiding a real or a major failure in the distributed storage system, or mitigating the consequences of an imminent failure or a failure that just occurred. For example, an operator may then promptly take actions ensuring that cascading failures are averted or/and that client-side operations (e.g. read/write operations) are not impacted (or at least minimally impacted).

Figure 4:
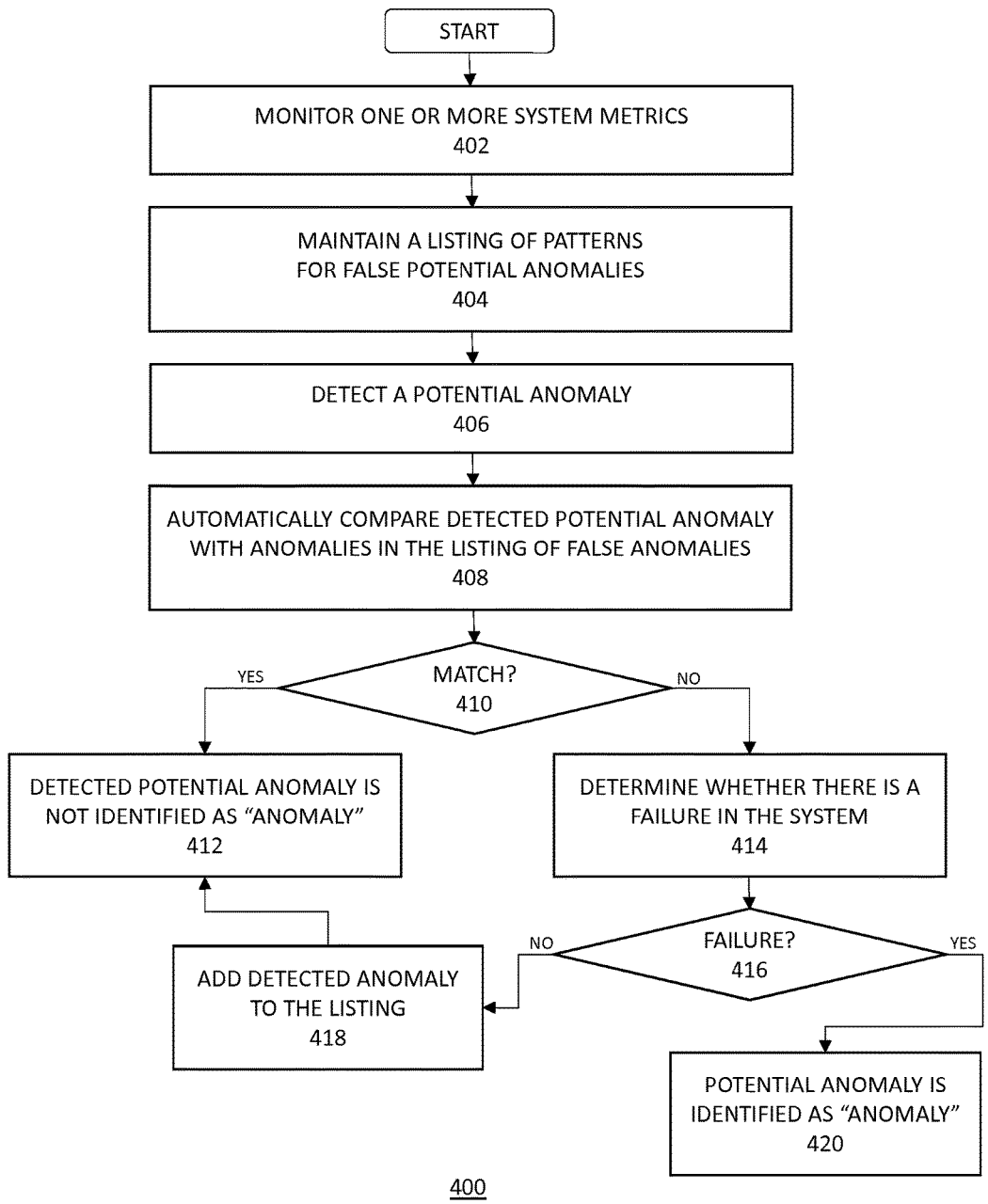
FIG. 4 shows a simplified flowchart of a second method for assisting evaluation of anomalies in a distributed storage system, according to some embodiments of the present disclosure.

FIG. 4 shows a simplified flowchart of a method 400 for assisting evaluation of anomalies in a distributed storage system, according to some embodiments of the present disclosure. The method 400 sets forth steps of the mechanism for correctly identifying potential anomalies in a distributed storage system. While steps of the method 400 are described with reference to elements of the network environment 100 shown in FIG. 1, any network elements or systems, in any configuration, configured to perform steps of the method 400 are within the scope of the present disclosure.

At 402, the anomaly evaluation system 110 (e.g. the monitoring module 112) is monitoring one or more system metrics associated with one or more storage nodes in the cluster 124 of the distributed storage system 120. In various embodiments, the monitored system metrics may include information related to at least one of on-going client operations, current CPU utilization, disk usage, available network bandwidth, remaining disk input/output operations per second (IOPS), remaining disk bandwidth, etc.

The anomaly evaluation system 110 is configured to maintain (either internally to the system 110, or in an external repository such as e.g. the false anomalies repository 166 to which the system 110 has access to) a listing of patterns of the monitored system metric which previously did not result in a failure within one or more nodes of the distributed storage system. This is shown in FIG. 4 as step 404, but it could take place continuously, and/or not in the order shown in FIG. 4.

In an embodiment, the patterns of the listing of 404 could include patterns that were previously identified as potential anomalies. In other embodiments, the patterns of the listing of 404 could include simulated patterns for potential anomalies or patterns generated in some other manner.

At 406, the anomaly evaluation system 110 (e.g. the anomaly detection module 114) detects a potential anomaly in the distributed storage system indicating a failure of one or more storage nodes, or an impending failure of one or more storage nodes in the cluster, based on real-time system metrics being monitored. In context of the method 400, the potential anomaly being identified in step 406 is typically associated with a plurality of values or with a certain pattern (i.e., a time series motif) of the monitored system metric(s). For example, if the metric for read latency of a storage drive attains an unusually high value (above a certain threshold) for at least t units of time then it indicates a potential anomaly.

In some embodiments, a potential anomaly could be identified in step 406 using Holt-Winters exponential smoothing or/and a Gaussian process based method. Some further means for detecting potential anomalies are described in greater detail in a dedicated section below.

At 408, the anomaly evaluation system 110 (e.g. the anomaly evaluation module 116) is configured to automatically (i.e. without user input) perform a similarity search to determine whether the potential anomaly pattern identified in 406 satisfies one or more similarity criteria with at least one pattern of the listing described in 404. Discussions provided above with respect to extending the method 200 with similarity search functionality are applicable here, and, therefore, in the interests of brevity, are not repeated.

At 410, the anomaly evaluation system 110 (e.g. the anomaly evaluation module 116) checks whether the similarity search yielded any matches. If so, then, at 412, the anomaly evaluation system 110 (e.g. the anomaly evaluation module 116) excepts the identified pattern from being identified as the potential anomaly (i.e. the potential anomaly detected at 406 is not identified as such).

If, at 410, the anomaly evaluation system 110 determines that there are no matches, then it could be established that the potential anomaly detected at 406 could indeed represent an anomaly. Assessment of the potential anomaly detected at 406 could stop at that. Alternatively, in an embodiment, the method 400 may then proceed with the anomaly evaluation system 110 (e.g. the anomaly evaluation module 116) determining whether there really is or was a failure in the distributed storage system at a time at or near the detected potential anomaly (step 414). In an embodiment, the determination of whether the identified pattern of step 406 is associated with a failure may be based on one or more logs generated by one or more services associated with the at least one system metric, provided there is monitoring and mapping of associated logs as described above with reference to FIG. 2.

At 416, the anomaly evaluation system 110 (e.g. the anomaly evaluation module 116) checks whether the failure analysis of 414 identified a failure. If not, then the method may proceed to 412 described above, where the anomaly evaluation system 110 (e.g. the anomaly evaluation module 116) excepts the identified pattern from being identified as the potential anomaly. Optionally, at 418, the anomaly evaluation system 110 (e.g. the anomaly evaluation module 116) adds the potential anomaly detected in 406 to the listing of 404.

If, at 416, the anomaly evaluation system 110 determines that there is a failure associated with the potential anomaly, then, at 420, it identifies (or confirms) that the anomaly detected in 406 is indeed an anomaly.

The method 400 provides a feedback mechanism that allows identifying certain detected potential anomalies as false positives which may then be saved as motifs in a time series and used later to do similarity search with newly identified anomalies. If the newly identified anomalies match any of the saved motifs, such anomaly is not considered to be an "anomaly" and not presented as one to an operator.

The method 400 may be combined with the method 200 in that, once a certain potential anomaly has been analyzed according to method 400 to determine whether or not it could be a true potential anomaly, results of the monitoring, including potential anomalies, if any, could be presented with a graphical representation as described in method 200.

Identification/Detection of Potential Anomalies

Identifying unusual trends in system metrics measuring read/write latencies, queue length, etc. for an OSD can help identify anomalous behaviors of storage nodes and can lead to tracking the storage nodes that can potentially fail in the near future.

According to a first approach that could be used to identify a potential anomaly in the methods shown in FIGS. 2 and 4, the recent behavior of a particular system metric could be compared to past behavior of this system metric to identify a metric that behaves anomalously. According to this approach, as an example of the anomaly detection of FIG. 2, a potential anomaly could be detected based on comparison of values of the monitored system metric within a specified time interval comprising the potential anomaly (i.e., within a certain time interval of a pattern (i.e. a time series motif) of the monitored system metric that was identified to include the potential anomaly) with values of the same system metric within an earlier time interval of the duration of the specified time interval (i.e. within the same time interval that has occurred in the past). For the example for the anomaly detection of FIG. 4, a pattern of the monitored system metric could be identified as a potential anomaly based on comparison of values of the monitored system metric within a duration of the pattern (i.e., within a certain time interval of the pattern) with values of the same system metric within an earlier time interval of the duration of the pattern. In this manner, the current values of the metric can be compared to previous values of the metric to determine whether there is an anomaly. For example, the current values of the metric being drastically different from the previous values may be indicative of a failure.

In the first approach described above, values of a particular system metric measured for the same storage node are used to identify a potential anomaly. According to a second approach that could be used to identify a potential anomaly in the methods shown in FIGS. 2 and 4, values of a system metric obtained for one storage node of the distributed storage system can be compared to values of the same metric obtained for other nodes of the system to determine whether there is an anomaly. For example, values of the metric for a first node being drastically different from the values of the same metric from another node may be indicative of a failure. Preferably, a comparison is made with multiple other nodes, in order to better resolve which values are "atypical" (e.g. if values of a metric in one node differ from the values of the same metric in twenty other nodes, then it is likely that there is a failure in the first node).

As an example scenario for the second approach, a storage node that is potentially about to fail will have higher read/write latencies and queue length than other storage nodes. Hence, by comparing these metrics of a particular storage node with other storage nodes it is possible to identify a potential failure scenario.

Suppose that the step of monitoring (in both FIGS. 2 and 4) includes measuring a set of n metrics corresponding to each storage node and suppose that there are m storage nodes in the distributed storage system 120. Then, at any given time t, the anomaly evaluation system 110 has access to m vectors, each having dimension n. One manner for identifying storage nodes that may be anomalous with respect to the entire population of the storage cluster 124 is to apply a clustering algorithm (e.g. using locality sensitive hashing, correlation clustering etc.) to identify which storage node, if any, is an outlier for that given time t. If a particular storage node is failing, then its queue length and latencies will typically be much higher than the overall population of storage nodes under consideration. Therefore, all such failing storage nodes can be identified by looking at the cluster that has a single (or less than a threshold) number of storage node. Another manner is based on applying robust Principal component analysis (PCA) to identify which storage nodes may be anomalous and also specifically which metric of a storage node may be anomalous with respect to all other storage nodes considered in the analysis. Given a data matrix X, robust PCA is a method by which X can be decomposed as the sum of three simpler matrices, L (a low rank matrix representing gross trends), S (a sparse matrix representing anomalies), and E (a matrix of small entries representing noise). The dimension of the data matrix X will be m x n, where each row corresponds to a node and there are m nodes in total in the system and each column corresponds to a certain metric that is common across all the nodes and there are n such common metrics in total.

According to the second approach, as an example of the anomaly detection of FIG. 2, a potential anomaly could be detected by monitoring at least one system metric for a first node of the distributed storage system and for a second node of the distributed storage system (i.e., the same metric is monitored for two different nodes), and the potential anomaly is then detected based on comparison of values of this system metric for the first node with values of the same system metric for the second node. For the example for the anomaly detection of FIG. 4, similar monitoring is performed and the pattern of the system metric for the first node is identified as a potential anomaly based on comparison of values of the system metric for the first node with values of the same system metric for the second node.

According to yet another approach that could be used to identify a potential anomaly in the methods shown in FIGS. 2 and 4, values of one metric for a node within the distributed storage system can be compared to values of another metric for the same node to determine whether there is an anomaly. For example, if a pattern could be identified as a potential anomaly in each of the metrics at the same time (or within a predefined amount of time overlap), it may be indicative of a failure of the node. The actual patterns of the two different metrics don't have to be the same patterns, as long as, for each metric, a pattern can be identified as a potential anomaly for that metric.

In various approaches, each system metric may be considered as a time series of values and can be broadly divided into two categories based on whether or not the time series exhibits periodic behavior. Different mechanisms may then be applied to analyzing system metrics belonging to different categories.

For time series with periodic behavior, the anomaly evaluation system 110 could be configured to apply e.g. Gaussian Process based online change detection algorithm, Seasonal ARIMA (autoregressive integrated moving average), Holt-Winters triple exponential smoothing method, etc. to detect any unexpected occurrences and/or changes in the behavior of metrics. These algorithms use a statistical model to predict the behavior of the metrics and use the difference between predicted and actual value of the metrics to detect changes in the metric value in an online fashion. Any unexpected change is flagged as an anomaly. If a storage node has a high percentage of metrics showing unexpected changes at a given time then this indicates a potential failure scenario.

For time series without periodic behavior, the anomaly evaluation system 110 could be configured to apply e.g. several change detection methods like CUSUM (cumulative sum control chart), Likelihood ratio test, Holt-Winters double exponential smoothing etc. These algorithms can be applied for detecting change in time series with non-periodic behavior.

One benefit of the approaches described above is that they do not rely on use of labeled data corresponding to disk failure for identifying drives that can potentially fail in the near future. These approaches are also scale-invariant, and work by finding deeper patterns in the metrics.

Variations and Implementations

In certain example implementations, functions related to anomaly evaluation as described herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as mapping databases to enable functions disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the anomaly evaluation functionality described herein. Additionally, each of these devices may include a processor that can execute software or an algorithm to perform the anomaly evaluation functionality as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of the anomaly evaluation, as potentially applied to a myriad of other architectures.

It is also important to note that the steps in the FIGS. 2 and 4 illustrate only some of the possible scenarios that may be executed by, or within, the anomaly evaluation system described herein. Some of these steps may be deleted or removed where appropriate, or these steps may be modified or changed considerably without departing from the scope of the present disclosure. In addition, a number of these operations have been described as being executed consecutively, concurrently with, or in parallel to, one or more additional operations. However, the timing of these operations may be altered considerably. The preceding operational flows have been offered for purposes of example and discussion. Substantial flexibility is provided by the anomaly evaluation system in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims;

and (b) does not intend, by any statement in the specification, to limit this disclosure in any way that is not otherwise reflected in the appended claims.

Although the claims are presented in single dependency format in the style used before the USPTO, it should be understood that any claim can depend on and be combined with any preceding claim of the same type unless that is clearly technically infeasible.

What is claimed is:

1. A method for assisting evaluation of anomalies in a distributed storage system, the method comprising:
   monitoring at least one system metric of the distributed storage system;
   maintaining a listing of patterns of the at least one system metric which previously did not result in a failure within one or more nodes of the distributed storage system;
   identifying a pattern of the at least one system metric as a potential anomaly in the distributed storage system;
   automatically performing a similarity search to determine whether the identified pattern satisfies one or more similarity criteria with at least one pattern of the listing; and
   upon positive determination, excepting the identified pattern from being identified as the potential anomaly.

2. The method according to claim 1, wherein the pattern of the at least one system metric is identified as a potential anomaly based on comparison of values of the at least one system metric within a duration of the pattern with values of the at least one system metric within an earlier time interval of the duration of the pattern.

3. The method according to claim 1, wherein:
   monitoring the at least one system metric of the distributed storage system comprises monitoring the at least one system metric for a first node of the distributed storage system,
   the method further comprises monitoring of the at least one system metric for a second node of the distributed storage system, and
   the pattern of the at least one system metric for the first node is identified as a potential anomaly based on comparison of values of the at least one system metric for the first node with values of the at least one system metric for the second node.

4. The method according to claim 1, wherein the pattern of the at least one system metric is identified as a potential anomaly based on comparison of values of the at least one system metric with values of at least one other system metric.

5. The method according to claim 1, further comprising:
   upon negative determination, determining whether the identified pattern is associated with the failure within one or more nodes of the distributed storage system.

6. The method according to claim 5, wherein the determination of whether the identified pattern is associated with the failure is based on one or more logs generated by one or more services associated with the at least one system metric.

7. The method according to claim 1, wherein the patterns of the listing were previously identified as potential anomalies.

8. A system for assisting evaluation of anomalies in a distributed storage system, the system comprising:
   at least one memory configured to store computer executable instructions, and
   at least one processor coupled to the at least one memory and configured, when executing the instructions, to:
   monitor at least one system metric of the distributed storage system;
   maintain a listing of patterns of the at least one system metric which previously did not result in a failure within one or more nodes of the distributed storage system;
   identify a pattern of the at least one system metric as a potential anomaly in the distributed storage system;
   automatically perform a similarity search to determine whether the identified pattern satisfies one or more similarity criteria with at least one pattern of the listing; and
   upon positive determination, except the identified pattern from being identified as the potential anomaly.

9. The system according to claim 8, wherein the pattern of the at least one system metric is identified as a potential anomaly based on comparison of values of the at least one system metric within a duration of the pattern with values of the at least one system metric within an earlier time interval of the duration of the pattern.

10. The system according to claim 8, wherein:
    monitoring the at least one system metric of the distributed storage system comprises monitoring the at least one system metric for a first node of the distributed storage system, the method further comprises monitoring of the at least one system metric for a second node of the distributed storage system, and
    the pattern of the at least one system metric for the first node is identified as a potential anomaly based on comparison of values of the at least one system metric for the first node with values of the at least one system metric for the second node.

11. The system according to claim 8, wherein the pattern of the at least one system metric is identified as a potential anomaly based on comparison of values of the at least one system metric with values of at least one other system metric.

12. The system according to claim 8, wherein the at least one processor is further configured to, upon negative determination, determine whether the identified pattern is associated with the failure within one or more nodes of the distributed storage system.

13. The system according to claim 12, wherein the determination of whether the identified pattern is associated with the failure is based on one or more logs generated by one or more services associated with the at least one system metric.

14. The system according to claim 8, wherein the patterns of the listing were previously identified as potential anomalies.

15. One or more computer readable storage media encoded with software comprising computer executable instructions and when the software is executed operable to perform a method for assisting evaluation of anomalies in a distributed storage system, the method comprising:
    monitoring at least one system metric of the distributed storage system;
    maintaining a listing of patterns of the at least one system metric which previously did not result in a failure within one or more nodes of the distributed storage system;
    identifying a pattern of the at least one system metric as a potential anomaly in the distributed storage system;
    automatically performing a similarity search to determine whether the identified pattern satisfies one or more similarity criteria with at least one pattern of the listing; and upon positive determination, excepting the identified pattern from being identified as the potential anomaly.

16. The one or more computer readable media according to claim 15, wherein the pattern of the at least one system metric is identified as a potential anomaly based on comparison of values of the at least one system metric within a duration of the pattern with values of the at least one system metric within an earlier time interval of the duration of the pattern.

17. The one or more computer readable media according to claim 15, wherein:
monitoring the at least one system metric of the distributed storage system comprises monitoring the at least one system metric for a first node of the distributed storage system,
the method further comprises monitoring of the at least one system metric for a second node of the distributed storage system, and
the pattern of the at least one system metric for the first node is identified as a potential anomaly based on comparison of values of the at least one system metric for the first node with values of the at least one system metric for the second node.

18. The one or more computer readable media according to claim 15, wherein the pattern of the at least one system metric is identified as a potential anomaly based on comparison of values of the at least one system metric with values of at least one other system metric.

19. The one or more computer readable media according to claim 15, wherein the method further comprises:
upon negative determination, determining whether the identified pattern is associated with the failure within one or more nodes of the distributed storage system.

20. The one or more computer readable media according to claim 15, wherein the patterns of the listing were previously identified as potential anomalies.

* * * * *